Patented Feb. 25, 1947

2,416,531

UNITED STATES PATENT OFFICE 2,416,531

PHENOL ESTERS OF SILICON OXYCHLORIDES AND METHOD OF PRODUCING THEM

Vaughan Morrill, Jr., St. Louis, Mo., assignor to American Stove Company, St. Louis, Mo., a corporation of New Jersey No Drawing. Application October 26, 1943, Serial No. 507,763

4 Claims. (Cl. 260—462)

REISSUED
SEP 26 1950
RE 23274

This invention pertains to a new composition of matter, often commonly referred to as a new product, and the method of making the same.

More particularly and specifically the new product results from a chemical reaction between phenol ($C_6H_5OH$) and the silicon oxychloride group and is a phenol silicate.

The new compound is produced by the following described method which although it produces a product which is satisfactory in all respects may not, on further research, prove to be either the most satisfactory, economical or desirable method possible to evolve for the production of the product.

The first step is the production of silicon oxychlorides which is done in the following manner. Lump silicon (98% pure) or of purity from 50% up of silicon in ferro-silicon, is heated to approximately 1200° F. in a suitable furnace or retort. The temperature reached is not critical and can safely vary between 1000° F. and 1500° F. Oxygen and chlorine are passed over the hot silicon and produce a mixture composed of the group of silicon oxychlorides and silicon tetrachloride. This mixture emerges from the retort or furnace as a vapor which is condensed and at room temperature is in the form of a liquid having an amber color. The group of silicon oxychlorides are separated from the silicon tetrachloride by fractional distillation. Silicon tetrachloride and the silicon oxychlorides present before separation by distillation are in proportion to one another which may be varied by regulating the rates of flow of chlorine and oxygen passed over the hot silicon. By increasing the percentage of chlorine passed over the hot silicon the resulting product will be high in percentage of silicon tetrachloride while a reduction in the percentage of chlorine and an increase in the percentage of oxygen passed over the hot silicon will cause the resulting product to contain a higher percentage of silicon oxychlorides.

The production of silicon oxychlorides is not new and their production is thoroughly described in an article by W. C. Schumb and D. F. Holloway which appears in the Journal of the American Chemical Society, volume 63, of October 1941, pp. 2753–55. This article is believed to give the most authoritative data on oxychlorides of silicon and gives, for the first time, the analysis of some of the oxychlorides in the group.

Reference should be had to said publication for a detailed study of the silicon oxychloride group. Among other things said article makes it clear that the group of silicon oxychlorides resulting from the chemical reaction of chlorine and oxygen on lump silicon at a dull red heat can be separated by fractional distillation and were found to be of the following formulas:

$(SiOCl_2)_4$       $Si_4O_3Cl_{10}$
$Si_2OCl_6$        $Si_5O_4Cl_{12}$
$Si_3O_2Cl_8$      $Si_6O_5Cl_{14}$
$Si_4O_4Cl_8$      $Si_7O_6Cl_{16}$

This article states that isolation of still higher members of the homologous series becomes almost impossible for the reason that the boiling point difference between each compound becomes less and less and the percentage differences in composition become too small for positive identification.

The article further recites that the substances separated out by fractional distillation, except the tetramer which is a colorless crystalline solid, are colorless, oily liquids increasing in viscosity with increasing molecular weight being hydrolyzed in the presence of moisture and being miscible with carbon tetrachloride, chloroform, carbon disulfide and silicon tetrachloride.

So far as the present invention is concerned the group of silicon oxychlorides are considered and treated as a single substance inasmuch as the group is difficult to separate into the separate products making up the group and are so similar as to make the products individually unimportant so far as the final product of this invention is concerned.

The next step in the method for producing my new product consists in chemically reacting phenol ($C_6H_5OH$) with the group of silicon oxychlorides. The reaction is carried on or performed in a suitable mixing vessel. The phenol is mixed at room temperature and atmospheric pressure with the silicon oxychlorides and they are gradually heated to approximately 850° F. When the phenol and oxychlorides are mixed hydrogen chloride is evolved. As the mixture is gradually heated hydrogen chloride continues to evolve until the mixture has reached a temperature of approximately 400° F. When the mixture has reached this temperature substantially all of the hydrogen chloride has been removed from the compound and upon carrying the mixture gradually up to a temperature of 850° F. the phenol silicates are boiled off. The rate of heating is gradual to prevent too rapid a reaction which if it occurred would cause some of the oxychlorides to boil off before the reaction with the phenol had taken place. The phenol silicates boiled off of the mixture are collected in a condenser as a single mixture which as a product is a clear to amber-colored liquid. A small amount of heavy tar-like substance will be present in the mixing vessel or retort and the 850° F. temperature is maintained until this residue is practically a solid. The residue is in all probability free silicon from the distillation of silicon hydrochlorides under heat. This residue is discarded.

To insure a complete reaction of the silicon oxychlorides with the phenol an excess of phenol is added to be present in the mixture. In actual practice it has been found desirable to add, by weight, phenol in approximately twice the amount of the silicon oxychlorides. It would be difficult to determine accurately the theoretical amount of phenol required as the exact percentages of the various oxychlorides in the new product is not known nor is it known how completely each of the oxychlorides reacts with the phenol.

The phenol silicates obtained by the described chemical reaction between phenol and the group of silicon oxychlorides are as follows:

All of the phenol silicates fall within the general formula:

where $n$ is greater than 1 with the exception of the first in the list which is the result of the tetramer and the 5th in the list which is the cyclical compound. Thus, although the first and fifth phenol silicates of the group do not follow in the general formula, they fall within it because it is well known in the chemical art that these phenol silicates are of the same group with the other phenol silicates and that they would be so recognized is evidenced by the Schumb and Holloway referred to report.

The new product is useful and valuable for the purposes hereinafter enumerated and it is believed that further research will reveal a much wider and varied field of use than it is possible at the present stage which has been reached in the research to enumerate or foretell.

It has been found that the product has great stability over a wide range from low to high temperatures and also a high dielectric strength. These attributes will, it is believed, give broad and general usages of the product as a transformer oil; as an electrical insulating medium, and as a paint plasticizer.

I claim:
1. The process for producing a mixture of phenol silicates comprising, mixing for chemical reaction phenol with a mixture of silicon oxychlorides comprising $Si_2OCl_6$; $Si_3O_2Cl_8$; $Si_4O_4Cl_8$; $Si_4O_3Cl_{10}$; $Si_5O_4Cl_{12}$; $Si_6O_5Cl_{14}$; and $Si_7O_6Cl_{16}$, heating said mixture and driving off therefrom substantially all of the hydrogenchloride therein, continuing said heating and condensing the vapor driven off by said continued heating to obtain phenol silicates as a single mixture, said mixture of phenol silicates comprising $SiO(C_6H_5O)_2$; $Si_2O(C_6H_5O)_6$; $Si_3O_2(C_6H_5O)_8$; $Si_4O_3(C_6H_5O)_{10}$; $Si_4O_4(C_6H_5O)_8$; $Si_5O_4(C_6H_5O)_{12}$; $Si_6O_5(C_6H_5O)_{14}$; and $Si_7O_6(C_6H_5O)_{16}$.

2. The process for producing phenol silicates comprising, mixing phenol and a mixture of silicon oxychlorides comprising $Si_2OCl_6$; $Si_3O_2Cl_8$; $Si_4O_4Cl_8$; $Si_4O_3Cl_{10}$; $Si_5O_4Cl_{12}$; $Si_6O_5Cl_{14}$; and $Si_7O_6Cl_{16}$ for chemical reaction and heating said mixture to approximately 850° F., and collecting and condensing the vapors of said mixture after the mixture has reached a temperature of approximately 400° F.

3. A new product resulting from the chemical reaction of phenol and a mixture of oxychlorides of silicon comprising $Si_2OCl_6$; $Si_3O_2Cl_8$; $Si_4O_4Cl_8$; $Si_4O_3Cl_{10}$; $Si_5O_4Cl_{12}$; $Si_6O_5Cl_{14}$; and $Si_7O_6Cl_{16}$, said compound being characterized by being stable at all temperatures between 0° F. and 800° F.

4. A high boiling point product comprising phenol silicates obtained by reacting phenol with a mixture of silicon oxychlorides comprising $Si_2OCl_6$; $Si_3O_2Cl_8$; $Si_4O_4Cl_8$; $Si_4O_3Cl_{10}$; $Si_5O_4Cl_{12}$; $Si_6O_5Cl_{14}$; and $Si_7O_6Cl_{16}$, said phenol silicates comprising $SiO(C_6H_5O)_2$; $Si_2O(C_6H_5O)_6$;

$$Si_3O_2(C_6H_5O)_8$$

$Si_4O_3(C_6H_5O)_{10}$; $Si_4O_4(C_6H_5O)_8$; $Si_5O_4(C_6H_5O)_{12}$; $Si_6O_5(C_6H_5O)_{14}$; and $Si_7O_6(C_6H_5O)_{16}$, said product being stable at all temperatures between 0° and 800° F., and being non-corrosive to stainless steel, iron, copper or brass.

VAUGHAN MORRILL, Jr.

REFERENCES CITED

The following references are of record in the file of this patent:

UNITED STATES PATENTS

| Number | Name | Date |
|---|---|---|
| 2,335,012 | Johnston | Nov. 23, 1943 |

FOREIGN PATENTS

| Number | Country | Date |
|---|---|---|
| 86,131 | Austrian | Nov. 10, 1921 |
| 168,659 | British | Feb. 15, 1921 |

OTHER REFERENCES

Beilstein, "Handbuch der Org. Chem.," vol. VI, 4th ed., p. 182.

Signer, "Annalen der Chemie," vol. 488, pp. 54–73, 1931.

Schumb, "Jour. Am. Chem. Soc.," vol. 63, pp. 2853–4, 1941.

Konrad, "Annalen der Chemie," vol. 474, pp. 276–295, 1929.

Pellini, "Gazz. Chim. Ital.," vol. 45 I, pp. 38–5, 1915.